United States Patent [19]
Obrist

[11] Patent Number: 5,304,110
[45] Date of Patent: Apr. 19, 1994

[54] MAGAZINE FOR TOOLS AND/OR WORKPIECES

[75] Inventor: Basil Obrist, Gontenschwil, Switzerland

[73] Assignee: Erowa AG, Reinach, Switzerland

[21] Appl. No.: 892,763

[22] Filed: Jun. 3, 1992

[30] Foreign Application Priority Data

Jun. 3, 1991 [DE] Fed. Rep. of Germany ....... 4118074

[51] Int. Cl.$^5$ ...................... B23Q 3/157; B23Q 41/02
[52] U.S. Cl. ...................................... 483/14; 483/63; 483/67; 211/1.55
[58] Field of Search ...................... 483/64, 66, 67, 60, 483/61, 62, 63, 14, 38; 211/1.52, 1.53, 1.54, 1.55, 1.57, 96, 168

[56] References Cited

U.S. PATENT DOCUMENTS

| | | | |
|---|---|---|---|
| 3,546,774 | 12/1970 | Stotterle et al. | 483/67 X |
| 4,240,194 | 12/1980 | Inami et al. | 483/67 X |
| 4,344,221 | 8/1982 | Pagani | 483/67 X |
| 4,558,506 | 12/1985 | Kielma | 483/67 X |

FOREIGN PATENT DOCUMENTS

| | | |
|---|---|---|
| 0132599 | 6/1984 | European Pat. Off. . |
| 0297034 | 6/1988 | European Pat. Off. . |
| 0212213 | 8/1984 | Fed. Rep. of Germany ........ 483/66 |
| 0236041 | 5/1986 | Fed. Rep. of Germany ........ 483/67 |

OTHER PUBLICATIONS

Moglichkeiten und Trends bei der automatischen Werkstuckhandhabung mit Industrierobotern, pp. 585–589, Published in "Zeitschrift fur industrielle Fertigung" 1986.

Primary Examiner—Z. R. Bilinsky
Attorney, Agent, or Firm—Tarolli, Sundheim & Covell

[57] ABSTRACT

The magazine, having a fixed place in a manufacturing plant, is intended to cooperate with at least one machining device and with a handling device associated with said machining device in order to automatically exchange tools and/or workpieces on said machining device. The magazine comprises a rotating rack having a plurality of storing planes mounted upon another on a support for bearing the objects to be handled. Said rotating rack is designed as a separate constructional unit which is exchangeably inserted in a stationary part of the magazine, which stationary part comprises means for rotating said rotating rack. In this manner, the space needed by the auxiliary devices in the magazine station as well as the moving space of the handling device is considerably reduced, due to the fact that even in a prolonged operation of the manufacturing plant one sole magazine is sufficient, and that thus, for the exchange of the objects to be handled, the action of any grip means is limited to this sole magazine.

10 Claims, 6 Drawing Sheets

MAGAZINE FOR TOOLS AND/OR WORKPIECES

TECHNICAL FIELD

This invention relates to a magazine for tools and/or workpieces, said magazine having a fixed position in a manufacturing plant and being intended to cooperate with at least one machining device and with a handling device associated with said machining device in order to automatically exchange tools and/or workpieces on said machining device, said magazine comprising a rotating rack having a plurality of storing planes mounted upon another on a support.

BACKGROUND OF THE INVENTION

Magazines of this kind, and for said purpose, are disclosed e.g. in the publications EP-A1-0,132,599 and EP-A2-0,297,034. They are known under the designation "multi-level revolving storage machines".

If a manufacturing plant is run non-attended and for a prolonged period of time, it may be necessary to place at disposal a considerable number of workpieces and tools, especially if the machining processes are quickly changing. This means that relatively large magazine rooms and handling devices covering wide areas are necessary. In this case, according to the status of the art, for operating one or more processing devices, often a plurality of multi-level revolving storage machines and, e.g., a portal robot are necessary, such as e.g. described in the publication "Möglichkeiten und Trends bei der automatischen Werkstückhandhabung mit Industrierobotern" ["Possibilities and trends in the automatic workpiece handling by industrial robots"], published in "Zeitschrift für industrielle Fertigung" 1986, No. 10, 76 (Springer-Verlag). It is known from experience that in this case the material expenditure and the space requirement are important. Furthermore, due to the largeness of the magazine rooms, the interruption time for re-stocking the magazines at their respective positions is long.

OBJECTS OF THE INVENTION

It is a primary object of the present invention to provide a conception for operating a manufacturing plant which avoids the abovementioned disadvantages of the prior art.

It is a further object of the invention to provide a magazine of the kind described above which allows a simple handling and restocking of the tools and/or workpieces which are necessary in such manufacturing plants, without interruption of the manufacturing process.

SUMMARY OF THE INVENTION

To meet these and other objects, the present invention provides a magazine for tools and/or workpieces which is fixedly positioned in a manufacturing plant. The magazine is intended to cooperate with at least one machining device and with a handling device associated with the machining device in order to automatically exchange tools and/or workpieces on the machining device. The magazine comprises a stationary part and a rotating rack having a plurality of storing planes mounted upon another on a support.

The rotating rack is designed as a separate constructional unit which is exchangeably inserted in the stationary part of the magazine, whereby the stationary part comprises means for rotating the rotating rack.

In this way, it is possible to have just a small storage capacity at the magazine station, and to use a simpler handling device for serving the machining device. Moreover, the access time to the magazine is reduced. The exchangeable rotating rack can periodically, or according to the requirements, be replaced by a rotating rack having new workpieces and tools, respectively, and be discharged and recharged outside the magazine station. The exchange can take place without interruption of the manufacturing process.

In a practical embodiment of the magazine of the present invention, the stationary part of the magazine comprises a stand provided with disengageable clutch means for bearing and rotating the rotating rack. Preferably, the disengageable clutch means cooperate with the two ends of the rotating support of the rotating rack.

In a preferred embodiment of the magazine according to the present invention, the rotating support of the rotating rack is provided at its lower end with a foot plate having a centering sleeve which is downwardly open, and at its upper end with a centering cone. The lower part of the stand comprises a driven rotating stool bearing the rotating rack. The rotating stool may be provided with an upwardly extending centering pin engaging the centering sleeve of the foot plate. The upper part of the stand comprises a shaft end provided with a downwardly open, freely rotatable conic center hole for taking up the centering cone of the rotating support. The rotating stool, together with a turnable drive unit for rotating the same, are mounted on a elevating platform forcing the rotating rack upwardly, in order to interlockingly position and hold the rotating support of the rotating rack between the rotating stool and the shaft end, and to frictionally connect the foot plate with the rotating stool.

For exchanging the rotating rack, i.e. for removing the actually used rotating rack from the magazine station and replacing it by another re-equiped rotating rack, the stationary part of said magazine may comprise a conveyer system having a horizontal conveyer. Preferably, the rotating rack can be lowered from its operation position to a point where its foot plate touches the conveyer and the clutch means, upon disengagement from the rotating rack, release the latter in the conveying direction.

The means for transferring the rotating rack from its operating position to the conveyer system may e.g. be constructed in such a way that the elevating platform can be lowered from its operation position to a point where the centering pin on the rotating stool disengages from the centering sleeve on the end of the rotating support, after the rotating rack was placed onto the conveyer system, and that the shaft end can upwardly be drawn-off for disengaging the centering cone on the upper end of the rotating support from the conic center hole on the shaft end. This allows that the disengagement of the rotating rack from the disengageable clutch means be effected in two phases, i.e. in the first phase the rotating rack is placed onto the conveyer system, while the upper clutch means are still engaged and the lower clutch means are disengaged, and in the second phase the upper clutch means are disengaged from the rotating rack.

The equiping and re-equiping, respectively, of the rotating rack removed from the magazine may be effected at any suitable place, e.g. in the immediate vicinity of the magazine station, or alternatively at a particular place destined for this purpose. Another possibility is to provide a particular equiping station which is located away from the magazine station for loading and unloading the rotating racks, and means of transport for transporting the rotating racks from the equiping station to the magazine station, and vice versa.

The conveyer system may be a roller conveyer having jointly driven rollers. Preferably, the magazine further comprises guide means mounted along the conveyer at the circumference of the foot plate for longitudinally guiding the rotating rack, and a stopper for stopping the incoming rotating rack in the center area.

BRIEF DESCRIPTION OF THE DRAWINGS

In the following, an embodiment of the magazine according to the invention will be further described, with reference to the accompanying drawings, in which.

DESCRIPTION OF A PREFERRED EMBODIMENT

Now, as an example, a preferred embodiment of the magazine according to the present invention will be described in more detail.

The magazine, which is shown as an example, comprises a stand 1 consisting of rectangular tubes and having a square horizontal projection. This stand 1 is of a height corresponding to the rotating rack 2, which is separately shown in FIG. 4, and comprises the stationary part of the magazine including the means for operating the rotating rack 2. The individual parts of this stand 1 will be described more in detail below, according to requirements.

Figure 3:
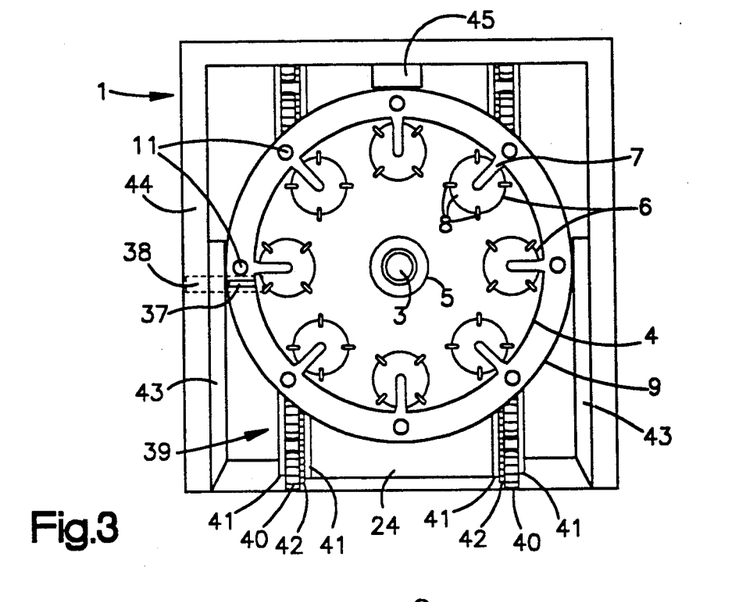
FIG. 3 is a horizontal projection of the magazine of FIG. 1.
Figure 4:
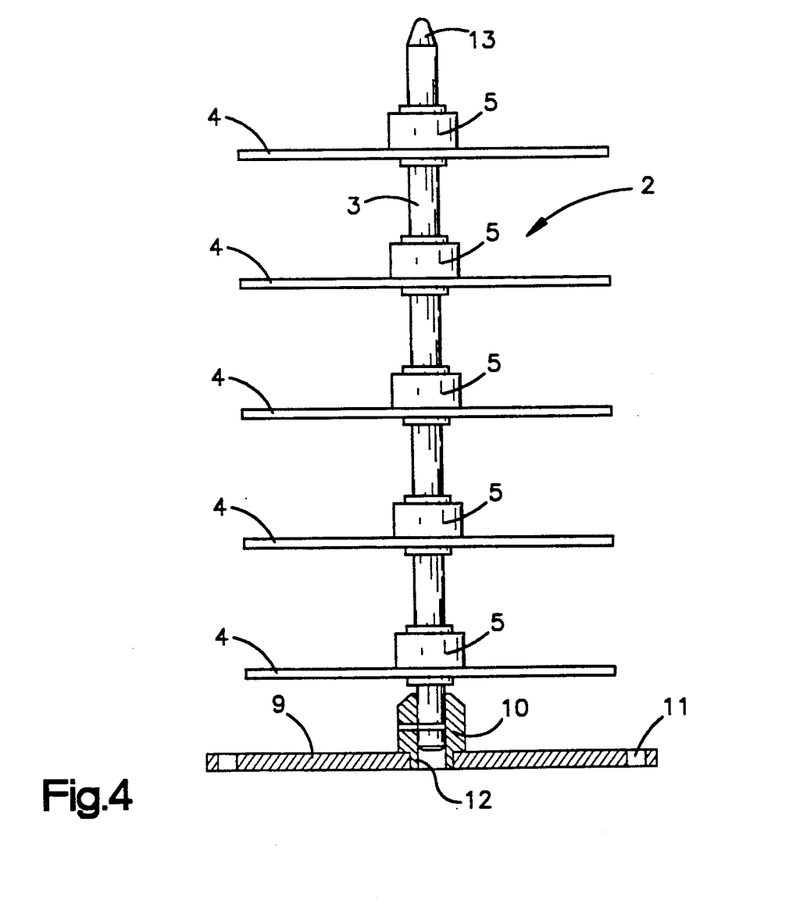
FIG. 4 is a side elevation of the exchangeable rotating rack designed as a separate constructional unit.

As shown in FIG. 4, the rotating rack, generally marked by "2", comprises, in a manner known per se, a rotating support 3 supporting a number of bearers 4, e.g. five bearers, for the objects to be handled (workpieces and/or tools). Said bearers 4 are shaped as circular plates, and are mounted at equal distances on several levels on said rotating support 3. For this purpose, each of the bearers 4 is provided with a hub 5 which is fixed (in a manner not shown in detail) to said rotating support 3, e.g. by means of pins. As shown in FIG. 3, each bearer 4 comprises at its circumference a number of storage places 6, e.g. six places. These storage places 6 are all of the same construction and may e.g. comprise a radial incision 7 and an axial recess 8 for correctly positioning the objects to be handled.

At its lower end, the rotating support 3 of the rotating rack 2 is provided with a foot plate 9 which may be fixed to the rotating support 3 by means of a hub 10, in a manner similar to that of the bearers 4. The foot plate 9 has a somewhat larger diameter than the bearers 4, and is provided near its circumference with a number of locking holes 11, e.g. eight locking holes, for positioning the rotating rack 2 in various angular positions. The hub 10 situated at the lower end of the rotating support 3 also forms an upwardly open centering sleeve 12. At its upper end, the rotating support 3 comprises a centering cone 13.

Clutch means are mounted on the stand 1 for bearing and operating the rotating rack 2. The clutch means cooperate with the ends of the rotating support 3 which are constructed as described above. The lower part of the stand 1 comprises a rotating stool 14 which bears the rotating rack 2 in its operational position, as shown in FIGS. 1 and 2.

Figure 6:
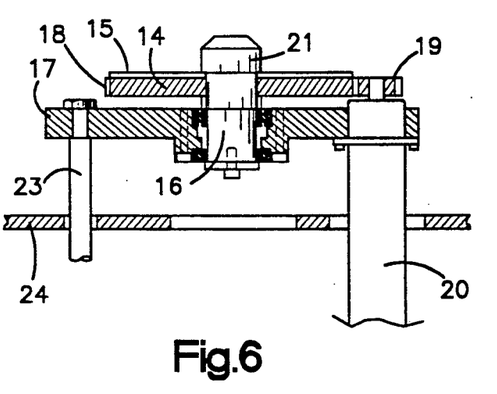
FIG. 6 is a sectional view, in a larger scale, of the lower clutch means in working order.
Figure 7:
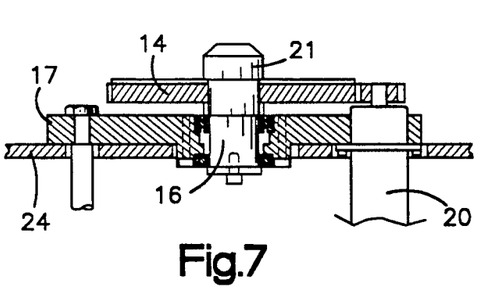
FIG. 7 is a sectional view analogous to FIG. 6, but showing the clutch means in disengaged position.

Details of this rotating stool 14 are shown in FIGS. 6 and 7. For frictionally connecting the rotating rack 2 and the rotating stool 14, the latter is provided with a friction lining 15. The rotating stool 14 is mounted on a shaft 16, these two elements being rotatably mounted on an elevating platform 17 in the manner shown. The rotating stool 14 is provided at its circumference with a toothing 18 which engages a pinion 19 of an electric driving motor 20 mounted on the elevating platform 17 for operating said rotating stool 14. The upper end of the shaft 16 forms an upwardly extending centering pin 21 which engages the centering sleeve 12 on the foot plate 9 of the inserted rotating rack 2 (FIG. 1). Four working cylinders 22 are provided for vertically adjusting the elevating platform 17. The working cylinders 22 are actuated by a pressurized fluid. Their piston rods 23 are connected to the elevating platform 17. The working cylinders 22 are mounted to the underside of a mounting plate 24 which in turn is supported by a upper frame part 25 of the stand 1.

Figure 1:
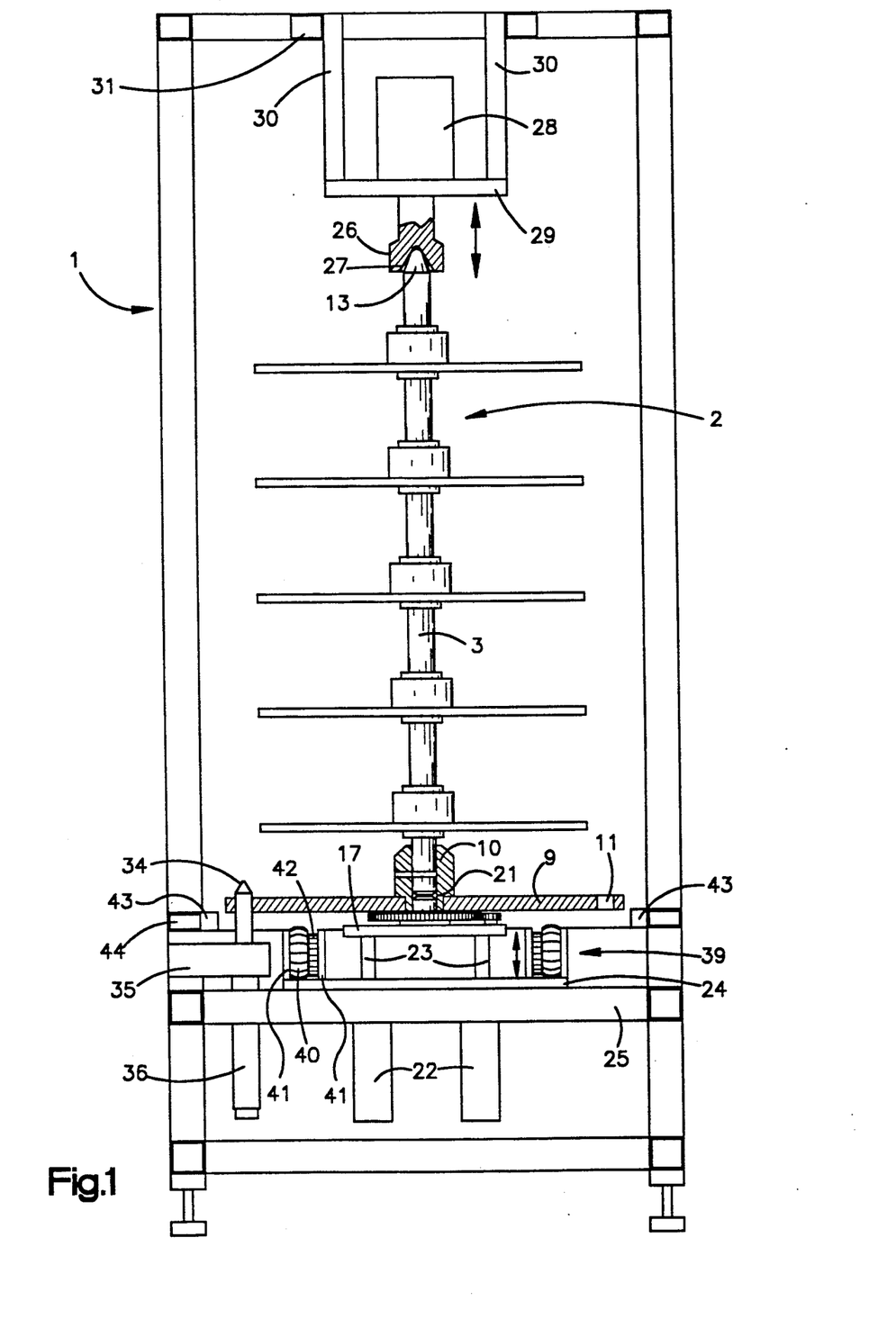
FIG. 1 is a front view of a magazine according to the invention comprising an exchangeable rotating rack.
Figure 2:
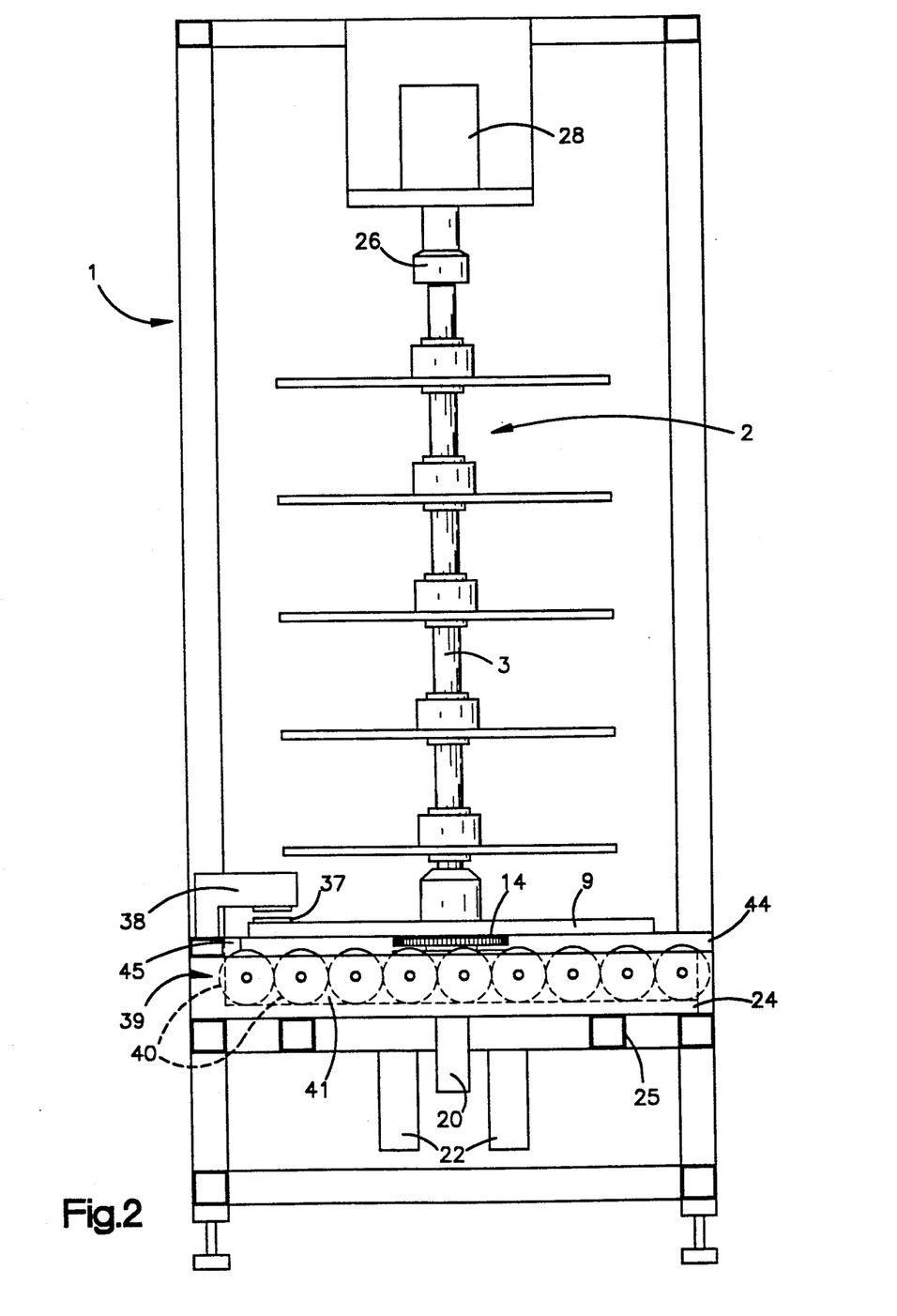
FIG. 2 is a side elevation of the magazine of FIG. 1.
Figure 8:
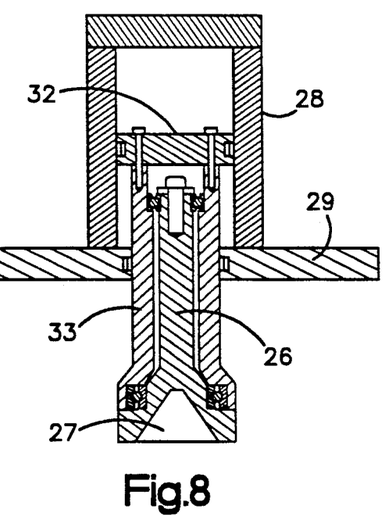
FIG. 8 is a sectional view, in a larger scale, of the upper clutch means in working order.

As shown in FIG. 1, the upper clutch means consist of a rotatable and vertically displaceable shaft end 26 comprising a downwardly open conic center hole 27 for taking up the centering cone 13 of the rotating support 3 of the rotating rack 2. The shaft end 26 is beared by a driving block 28 which in turn is supported by a platform 29 which is mounted to an upper frame part 25 of the stand 1 by means of supporting plates 30. As shown in detail in FIGS. 8 and 9, the driving block 28 is, as diagrammicly represented, a working cylinder comprising a pressure piston 32, the shaft end 26 being freely rotatably beared in the hollow piston rod 33.

When the magazine is in operation, the elevating platform 17 is, under the action of the working cylinder 22, in an upper end position (FIGS. 1, 2 and 6), and the pressurized working cylinder 28 pushes the shaft end 26, in the opposite direction of force, against the upper end 13 of the rotating support 3. Thereby, the centering pin 21 on the rotating stool 14 engages the centering sleeve 12 at the lower end of the rotating support 3, and the centering cone 13 at the upper end of the rotating support 3 engages the conic center hole 27 of the shaft end 26. In this manner, the rotating support 3 is interlockingly positioned and held between the rotating stool 14 and the shaft end 26, and the foot plate 14 is frictionally connected with the rotating stool 14.

A vertically movable locking pin 34 cooperating with the locking holes 11 of the foot plate 9 is provided, in a manner known per se, for fixing the rotating rack 2 in those angular positions which are planned for removing the objects to be handled 53 by means of a handling device 51. The locking pin 34 is displaced by a working cylinder 36, mounted on the stand 1, by means of an intermediate supporting arm 35 (FIG. 1). Furthermore, an electronic storage device 37 is mounted at the rim of the foot plate 9. This electronic storage device 37 contains information for identifying the inserted rotating rack which information can be read by a reading device 38 mounted on the stand 1 (FIG. 2).

For exchanging the rotating rack 2, the stationary part of the magazine comprises a conveyer system 39 having a horizontal conveyer onto which the rotating rack 2 can be lowered. This conveyer system 39 is a roller conveyer mounted on the mounting plate 24. The rollers of the roller conveyer are beared in plane-parallel supporting plates 41 and driven by means of chains 42 by a common driving motor (not shown). Guide rails 43 are provided at the circumference of the foot plate 9 along the conveyer on a frame part 44 of the stand 1, for longitudinally guiding the rotating rack 2 (FIGS. 1 and 3). A stopper 45 is mounted on the same frame part 44 (FIGS. 2 and 3). The foot plate 9 knocks against this stopper 45 when a rotating rack 2 on the conveyer system 39 is moved into the stand 1. In this way, the rotating rack 2 is stopped in the central area, so that the centering pin 21 can engage the centering sleeve 12, and the centering cone 13 can engage the conic center hole 27.

Figure 5:
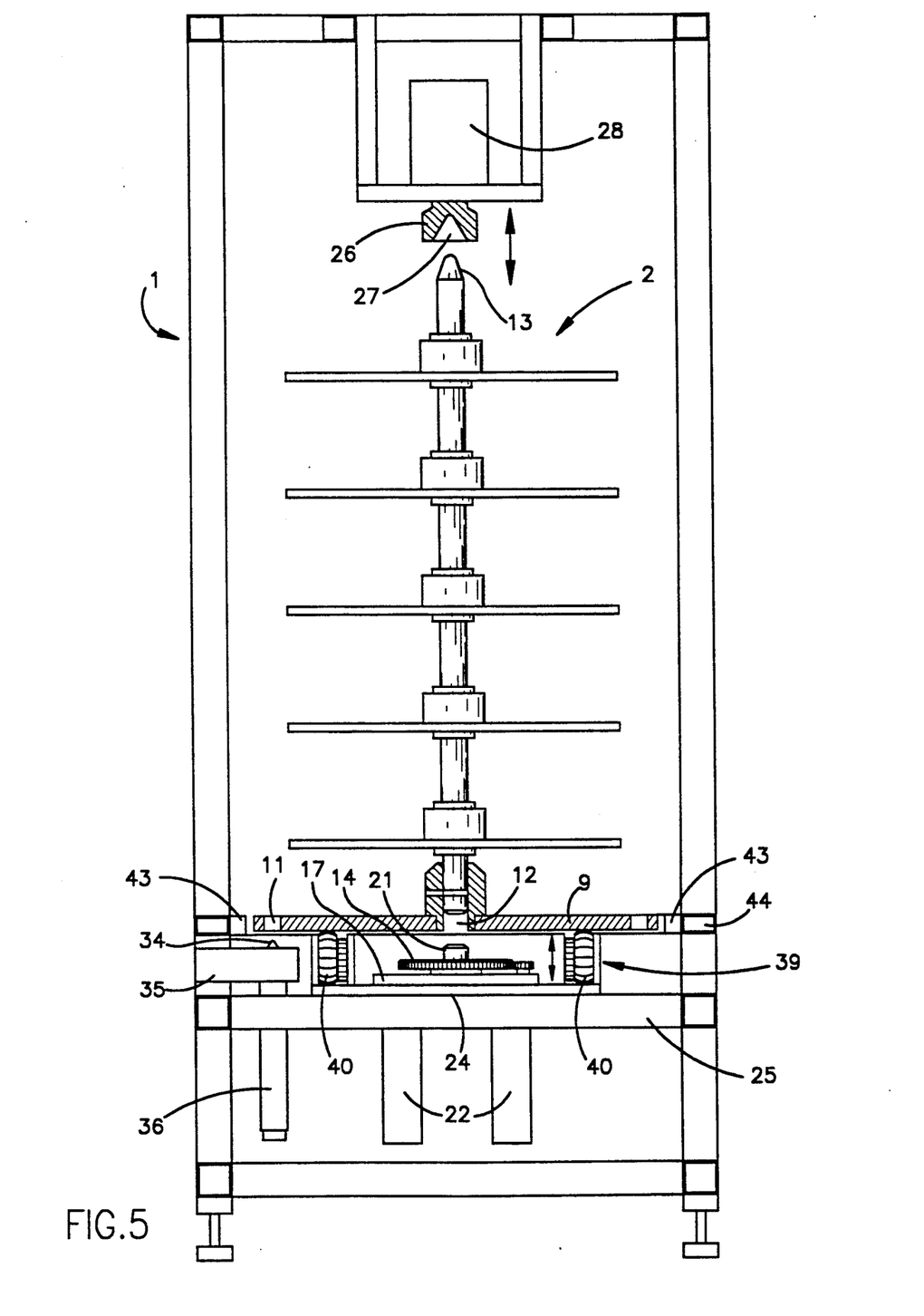
FIG. 5 is a front view of the magazine of FIG. 1 showing the conveyer system in a lowered position and the rotating rack disengaged from the clutch means.
Figure 9:
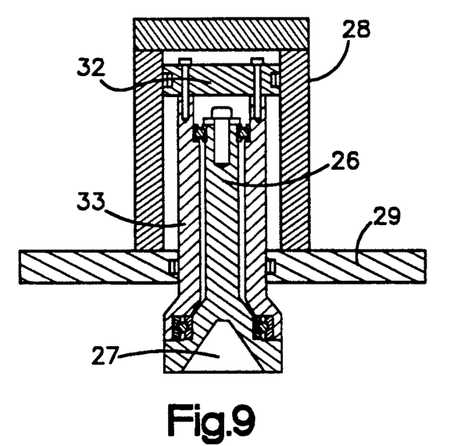
FIG. 9 is a sectional view analogous to FIG. 8, but showing the clutch means in disengaged position.

Removal of a rotating rack 2 is effected as follows: First, the rotating rack 2 is moved from the operating position shown in FIGS. 1 to 3 into the transportation position shown in FIG. 5, i.e. placed onto the rollers 40 of the conveyer system 39. For this purpose, the elevating platform 17 can be lowered from its operation position to a point where the centering pin 21 on the rotating stool 14 disengages from the centering sleeve 12 on the lower end of the rotating support 3 after the foot plate 9 was put onto the rollers 40. Thereby, the working cylinder 28 remains pressurized, thus maintaining the guiding effect at the upper end of the rotating support 3 during the downward movement. Thereafter, the shaft end 26 is upwardly drawn-off by counterpressurizing the working cylinder 28 for disengaging the centering cone 13 at the upper end of the rotating support 3 from the conic center hole 27 in the shaft end 26. By this, the rotating rack 2 is disengaged form the lower and upper clutch means, the final positions of which are shown in FIGS. 7 and 9. The rotating rack 2 can now be moved by the conveyer system 39 out from the stand 1 at its front side, as shown in FIG. 1, as soon as the locking pin 34 was downwardly withdrawn from the so far occupied locking hole 11 in the foot plate 9.

In the most simple case, the rotating rack 2 removed from the stand 1 is transferred to a truck (hand-truck or motor-truck) brought to the stand 1, while another rotating rack 2 containing the replacing objects to be handled is brought to the stand 1 on another truck and is inserted into the stand 1 by means of the conveyer system 39. Preferably, such trucks are provided with a rolling platform for facilitating the transfer, and with means for fixing the rotating rack to be transported on the platform.

Figure 10:
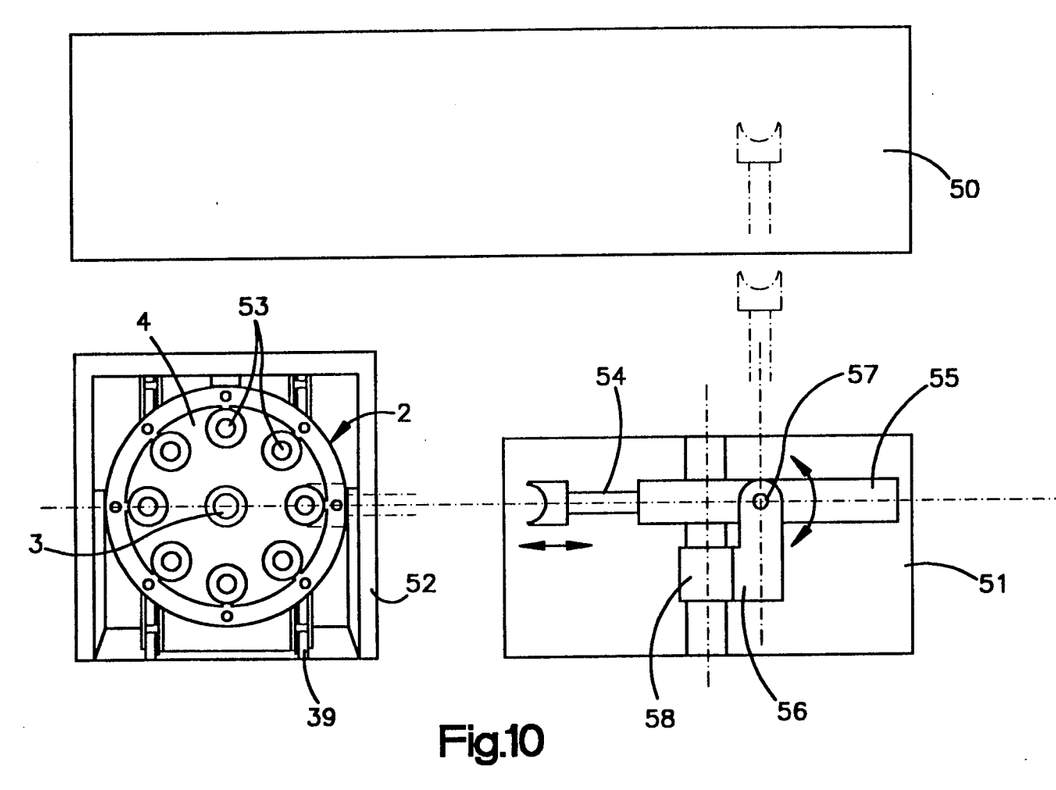
FIG. 10 is a diagrammic representation of a simple manufacturing plant comprising a processing device, a handling device for automatically exchanging workpieces and/or tools, and a magazine for the objects to be handled, according to the invention.

FIG. 10 diagrammically represents, as an example, the layout of a simple manufacturing plant, comprising a processing device 50, a handling device 51, and a magazine 52 according to the invention, the magazine comprising an exchangeable rotating rack 2 of the construction shown in FIGS. 1 to 9 bearing symbolically traced tools and workpieces 53, respectively. The handling device 51 comprises three controlled axles and a grip arm 54 which is mounted in a longitudinally movable manner in a bearing part 55. The bearing part 55 is mounted on a carriage 56 and is rotatable around the axis 57 which in turn is mounted on a stationary support 58 in a vertically movable manner. The various phases of movement of the grip arm 54 during the exchange of tools and workpieces, respectively, are traced in dot-dash lines.

FIG. 10 clearly shows that the auxiliary devices take only relatively limited space of the station, and that the handling device 51 needs only limited moving space. This advantage is due to the fact that even in a prolonged operation of the manufacturing plant one sole magazine 52 of the kind described above is sufficient, and that thus, for the exchange of the objects to be handled, the action of the grip arm 54 is limited to this sole magazine 52.

What is claimed is:

1. A magazine for tools and/or workpieces and for fixedly positioning in a manufacturing plant having at least one machining device and a handling device associated with the machining device, said magazine comprising:

means for cooperating with the at least one machining device and the handling device to automatically exchange tools and/or workpieces on the machining device;

a stationary part;

a rotating rack being a separate constructional unit and being exchangeably inserted in said stationary part, said rotating rack having a rotating support and a plurality of bearers stacked on said rotating support, said rotating support having opposite ends;

said stationary part comprising means for rotating said rotating rack inserted in said stationary part; and said stationary part comprising a stand including disengageable first and second clutch means for bearing and driving said rotating rack, said first clutch means being located at one end of said rotating support of said rotating rack and said second clutch means being located at the other end of said rotating support of said rotating rack and cooperating with said first clutch means to enable rotation of said rotating rack on said rotating support.

2. A magazine according to claim 1 wherein:

said other end of said rotating support is an upper end with a centering cone and said one end of said rotating support is a lower end with a foot plate having a centering sleeve which is downwardly open;

said stand comprises a lower part including a driven rotating stool bearing said rotating rack, and an upper part including a shaft end provided with a downwardly open, freely rotatable conic center hole for taking up said centering cone of said rotating support, said rotating stool being provided with an upwardly extending centering pin engaging into said centering sleeve of said foot plate; and said rotating stool together with a turnable drive unit for rotating the same are mounted on an elevating platform, said elevating platform pushing said rotating rack upwardly, in order to interlockingly position and hold said rotating support of said rotating rack between said rotating stool and said shaft end, and to frictionally connect said foot plate with said rotating stool.

3. A magazine according to claim 2 wherein said stationary part comprises a conveyor system having a horizontal conveyor for exchanging said rotating rack.

4. A magazine according to claim 3 wherein:
said rotating rack can be lowered from an operation position to a point where said foot plate touches said conveyor; and
said first and second clutch means, upon disengagement from said rotating rack, releases the latter in the conveying direction.

5. A magazine according to claim 4 wherein:
said elevating platform can be lowered from an operation position to a point where said centering pin on said rotating stool disengages said centering sleeve on the lower end of said rotating support after said rotating rack is put down onto said conveyor system; and
said shaft end can be drawn-off upwardly for disengaging said centering cone on the upper end of said rotating support from said conic center hole on said shaft end, thereby allowing the disengagement of said rotating rack from said disengageable first and second clutch means to be effected in two phases, whereby (i) in the first phase said rotating rack is moved down onto said conveyor system while said first clutch means is still engaged and said second clutch means is disengaged, and (ii) in the second phase said first clutch means is disengaged from said rotating rack.

6. A magazine according to claim 3 further comprising guide means mounted along said conveyor at the circumference of said foot plate for longitudinally guiding said rotating rack.

7. A magazine according to claim 3 wherein said conveyor is provided with a stopper for stopping an incoming rotating rack in a centering area.

8. A magazine according to claim 3 wherein said conveyor system is a roller conveyor comprising jointly driven rollers.

9. A magazine for tools and/or workpieces and for fixedly positioning in a manufacturing plant having at least one machining device and a handling device associated with the machining device, said magazine comprising:
means for cooperating with the at least one machining device and the handling device to automatically exchange tools and/or workpieces on the machining device;
a stationary part;
a rotating rack being a separate constructional unit and being exchangeably inserted in said stationary part, said rotating rack having a rotating support and a plurality of bearers stacked on said rotating support, said rotating support having opposite ends;
said stationary part comprising means for rotating said rotating rack inserted in said stationary part;
said stationary part comprising a stand including disengageable clutch means for bearing and driving said rotating rack, said disengageable clutch means cooperating with both ends of said rotating support of said rotating rack;
said rotating support including an upper end with a centering cone and a lower end with a foot plate having a centering sleeve which is downwardly open;
said stand comprising a lower part including a driven rotating stool bearing said rotating rack, and an upper part including a shaft end provided with a downwardly open, freely rotatable conic center hole for taking up said centering cone of said rotating support, said rotating stool being provided with an upwardly extending centering pin engaging into said centering sleeve of said foot plate; and
said rotating stool together with a turnable drive unit for rotating the same being mounted on an elevating platform, said elevating platform pushing said rotating rack upwardly, in order to interlockingly position and hold said rotating support of said rotating rack between said rotating stool and said shaft end, and to frictionally connect said foot plate with said rotating stool.

10. A magazine for tools and/or workpieces and for fixedly positioning in a manufacturing plant having at least one machining device and a handling device associated with the machining device, said magazine comprising:
means for cooperating with the at least one machining device and the handling device to automatically exchange tools and/or workpieces on the machining device;
a stationary part;
a rotating rack being a separate constructional unit and being exchangeably inserted in said stationary part, said rotating rack having a rotating support and a plurality of bearers stacked on said rotating support, said rotating support having opposite ends;
said rotating support including an upper end with a centering cone and a lower end with a foot plate having a centering sleeve which is downwardly open;
said stand comprising a lower part including a driven rotating stool bearing said rotating rack, and an upper part including a shaft end provided with a downwardly open, freely rotatable conic center hole for taking up said centering cone of said rotating support, said rotating stool being provided with an upwardly extending centering pin engaging into said centering sleeve of said foot plate;
said rotating stool together with a turnable drive unit for rotating the same being mounted on an elevating platform, said elevating platform pushing said rotating rack upwardly, in order to interlockingly position and hold said rotating support of said rotating rack between said rotating stool and said shaft end, and to frictionally connect said foot plate with said rotating stool;
said stationary part comprising means for rotating said rotating rack inserted in said stationary part;
said stationary part comprising a stand including disengageable clutch means for bearing and driving said rotating rack, said disengageable clutch means cooperating with both ends of said rotating support of said rotating rack, said disengageable clutch means including upper clutch means and lower clutch means;

said stationary part comprising a conveyor system having a horizontal conveyor for exchanging said rotating rack;

said rotating rack being able to be lowered from an operation position to a point where said foot plate touches said conveyor;

said disengageable clutch mans, upon disengagement from said rotating rack, releasing the latter in the conveying direction;

said elevating platform being able to be lowered from an operation position to a point where said centering pin on said rotating stool disengages said centering sleeve on the lower end of said rotating support after said rotating rack is put down onto said conveyor system; and said shaft end being able to be drawn-off upwardly for disengaging said centering cone on the upper end of said rotating support from said conic center hole on said shaft end, thereby allowing the disengagement of said rotating rack from said disengageable clutch means to be effected in two phases, whereby (i) in the first phase said rotating rack is moved down onto said conveyor system while said upper clutch means is still engaged and said lower clutch means is disengaged, and (ii) in the second phase said upper clutch means is disengaged from said rotating rack.

* * * * *